United States Patent
Lardy et al.

(10) Patent No.: US 9,597,748 B2
(45) Date of Patent: Mar. 21, 2017

(54) INERTIA FRICTION WELDING METHOD FOR WELDING TOGETHER TWO PORTIONS OF A ROTARY SUBASSEMBLY OF A TURBINE ENGINE

(71) Applicant: SNECMA, Paris (FR)

(72) Inventors: Benoit Lardy, Yerres (FR); Dominique Bernard Lourdin, Le Coudray Montceaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/112,610

(22) PCT Filed: Jan. 16, 2015

(86) PCT No.: PCT/FR2015/050112
§ 371 (c)(1),
(2) Date: Jul. 19, 2016

(87) PCT Pub. No.: WO2015/110746
PCT Pub. Date: Jul. 30, 2015

(65) Prior Publication Data
US 2016/0339539 A1    Nov. 24, 2016

(30) Foreign Application Priority Data
Jan. 24, 2014    (FR) ..................... 14 50610

(51) Int. Cl.
*B23K 20/00*    (2006.01)
*B23K 20/12*    (2006.01)
(Continued)

(52) U.S. Cl.
CPC .......... *B23K 20/129* (2013.01); *F04D 29/322* (2013.01); *F04D 29/324* (2013.01);
(Continued)

(58) Field of Classification Search
CPC  B23K 2201/001; B23K 20/12; B23K 20/129; B23K 37/0443; F01D 5/063; F01D 11/008; F05D 2230/239
(Continued)

(56) References Cited

U.S. PATENT DOCUMENTS 8,163,399 B2 *    4/2012    Schroth .................. B22D 19/00
                                                            428/143
8,758,902 B2 *    6/2014    Hanna .................... B22D 19/00
                                                            164/75

(Continued)

FOREIGN PATENT DOCUMENTS

EP    1 598 524 A1    11/2005
EP    1 927 722 A1     6/2008
(Continued)

OTHER PUBLICATIONS

International Search Report issued Apr. 22, 2015 in PCT/FR2015/050112 filed Jan. 16, 2015.

*Primary Examiner* — Erin Saad
(74) *Attorney, Agent, or Firm* — Oblon, McClelland, Maier & Neustadt, L.L.P.

(57) ABSTRACT

An inertia friction welding (IFW) method for welding together two portions of a rotary subassembly for a turbine engine is provided. At least one of the portions includes a plurality of hooked teeth at its periphery for anchoring blade roots. One of the two portions for welding together is held by a clamp and set into rotation by a motor, and the other one of the two portions for welding together is held by a torque take-up ring gear mounted on a carriage that is movable in translation. In order to avoid any crack formation in the hooks of the teeth during welding, the plurality of hooked teeth is covered with a damper device for shifting the frequency of the vibratory response of the teeth, thereby creating damping.

10 Claims, 5 Drawing Sheets

(51) Int. Cl.
*F04D 29/32* (2006.01)
*F04D 29/66* (2006.01)

(52) U.S. Cl.
CPC ........ *F04D 29/668* (2013.01); *F05B 2220/30* (2013.01); *F05B 2230/239* (2013.01)

(58) Field of Classification Search
USPC .................. 228/2.1, 112.1, 113, 2.3, 119
See application file for complete search history.

(56) References Cited

U.S. PATENT DOCUMENTS

| | | |
|---|---|---|
| 2004/0108358 A1 | 6/2004 | Carrier et al. |
| 2006/0051211 A1 | 3/2006 | Ferte et al. |
| 2008/0124210 A1 | 5/2008 | Wayte et al. |
| 2012/0064255 A1* | 3/2012 | Willson ............. C03C 8/20 427/452 |
| 2013/0133194 A1 | 5/2013 | Belmonte et al. |

FOREIGN PATENT DOCUMENTS

| | | |
|---|---|---|
| EP | 2014/118464 A1 | 8/2014 |
| FR | 2 963 577 A1 | 2/2012 |

* cited by examiner

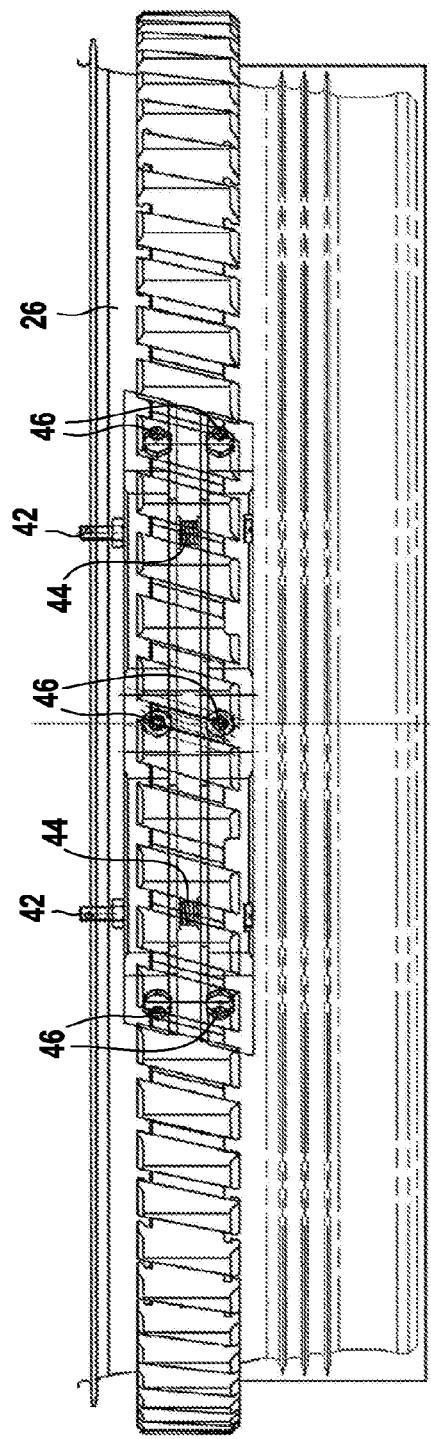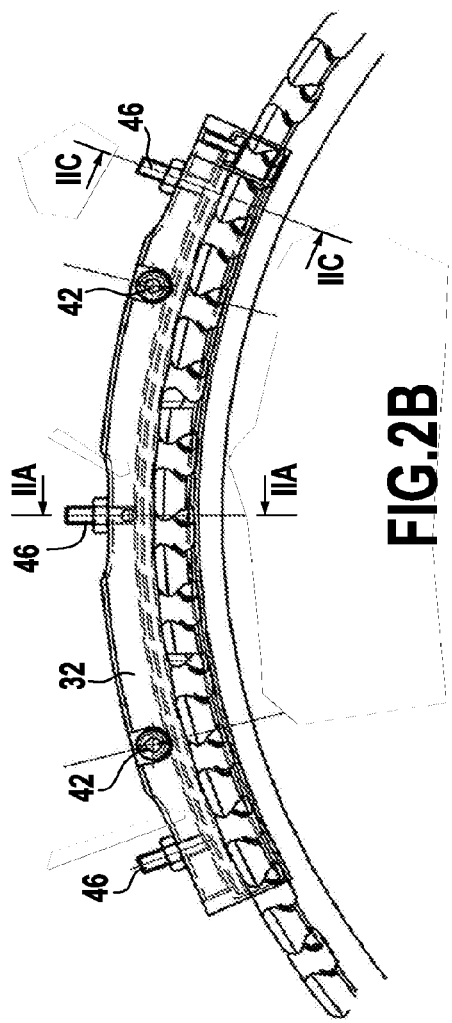

INERTIA FRICTION WELDING METHOD FOR WELDING TOGETHER TWO PORTIONS OF A ROTARY SUBASSEMBLY OF A TURBINE ENGINE

BACKGROUND OF THE INVENTION

The invention relates to the field of friction welding in the process for fabricating turbine engine components (compressors, turbines, etc.), and more particularly it relates to an inertial friction welding (IFW) method for welding together stage disks of a high-pressure compressor for a turbine engine in which at least one disk has a peripheral set of hooked teeth for anchoring blade roots.

As a result of tests performed using strain gauge instruments, it is known that the IFW used for assembling together stage disks of a high-pressure compressor for a turbine engine generates stresses that lead to cracks appearing, which cracks are revealed by dye-penetrant testing, and appear in particular in the hooked zone of the disks.

Unfortunately, such crack initiation is unacceptable for parts that are essential to the integrity of the turbine engine.

There therefore exists a need to improve the present IFW method in order to eliminate such crack initiation.

OBJECT AND SUMMARY OF THE INVENTION

A main object of the present invention is thus to propose an IFW method that mitigates this drawback.

This object is achieved by an inertia friction welding method for welding together two portions of a rotary subassembly for a turbine engine, at least one of which portions includes a plurality of hooked teeth at its periphery for anchoring blade roots, and wherein one of the two portions for welding together is held by a clamp and set into rotation by a motor, and the other one of the two portions for welding together is held by a torque take-up ring gear mounted on a carriage that is movable in translation, the method being characterized in that in order to avoid any crack formation in the hooks of said teeth during welding, provision is made to cover said plurality of hooked teeth with damper means suitable for shifting the frequency of the vibratory response of said teeth, thereby creating damping.

Thus, with this damper arrangement shifting the frequency of the vibratory response and damping the hooks, it is ensured that sufficient energy is absorbed to avoid cracks being created in the disk.

Preferably, said damper means comprise seven adjacent damper sectors covering said plurality of hooked teeth entirely, each covering an angle of about 51 degrees.

In a first implementation, each of said damper sectors has two lateral flanks fitting closely to the circumference of the disk and bearing against the lateral edges of the teeth via a first viscoelastic gum, two top rims of these flanks coming to bear against two clamping plates in contact with the top edges of the teeth via a second viscoelastic gum.

Preferably, said plates are held clamped by bolts compressing spring means arranged between these two plates and acting as a return spring when they are unclamped.

In a second implementation, said damper means comprise a respective individual damper mounted on each of the teeth of said set of hooked teeth.

Advantageously, each said individual damper comprises a first blade having one end terminated by a rim co-operating with one of the two hooks of a tooth, and a second blade having one end that is terminated by a rim co-operating with the other one of the two hooks of said tooth, the other ends of said first and second blades being secured to each other by fastener means.

To make it possible, by applying clamping in two directions, for the rims to grip the corresponding hooks and thus retain said individual damper mechanically against said tooth, said other ends of said first and second blades are each terminated by a respective slope.

Preferably, said first blade has length and width corresponding substantially to the length and width of a tooth, and said second blade has a length corresponding substantially to the height of a tooth and a width corresponding substantially to the width of a tooth.

Advantageously, on their inside faces in contact with said teeth, said first and second blades are covered in viscoelastic gums.

BRIEF DESCRIPTION OF THE DRAWINGS

Other characteristics and advantages of the present invention appear from the following description made with reference to the accompanying drawings, which show an implementation having no limiting character, and in which:

FIGS. 2 and 2A to 2C show a first embodiment of damper means used in the method of the invention.

DETAILED DESCRIPTION OF AN IMPLEMENTATION

Figure 1A:
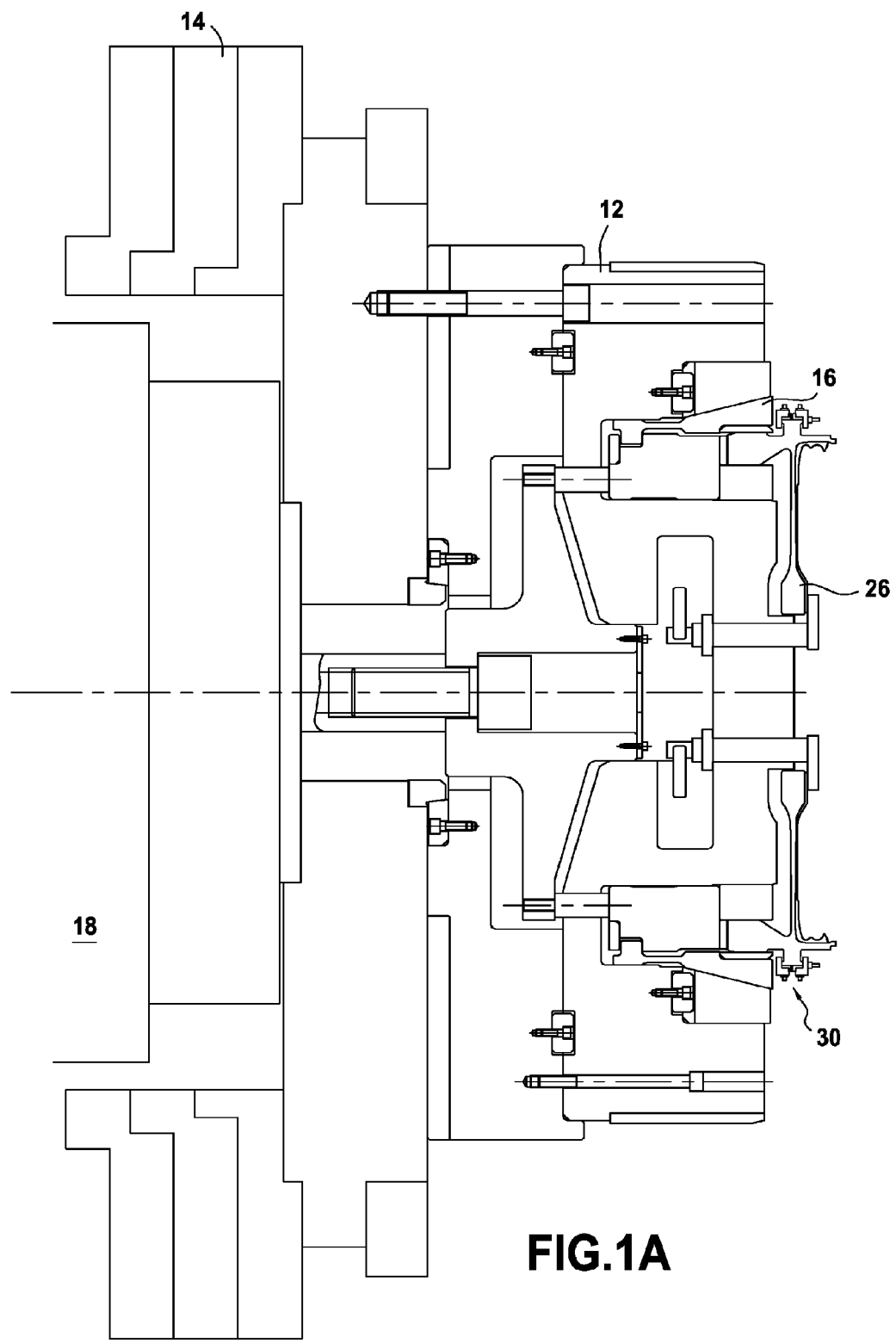
FIGS. 1A and 1B are detailed section views respectively of the chuck and of the carriage of an inertia friction welding (IFW) machine suitable for performing the method of the invention.
Figure 1B:
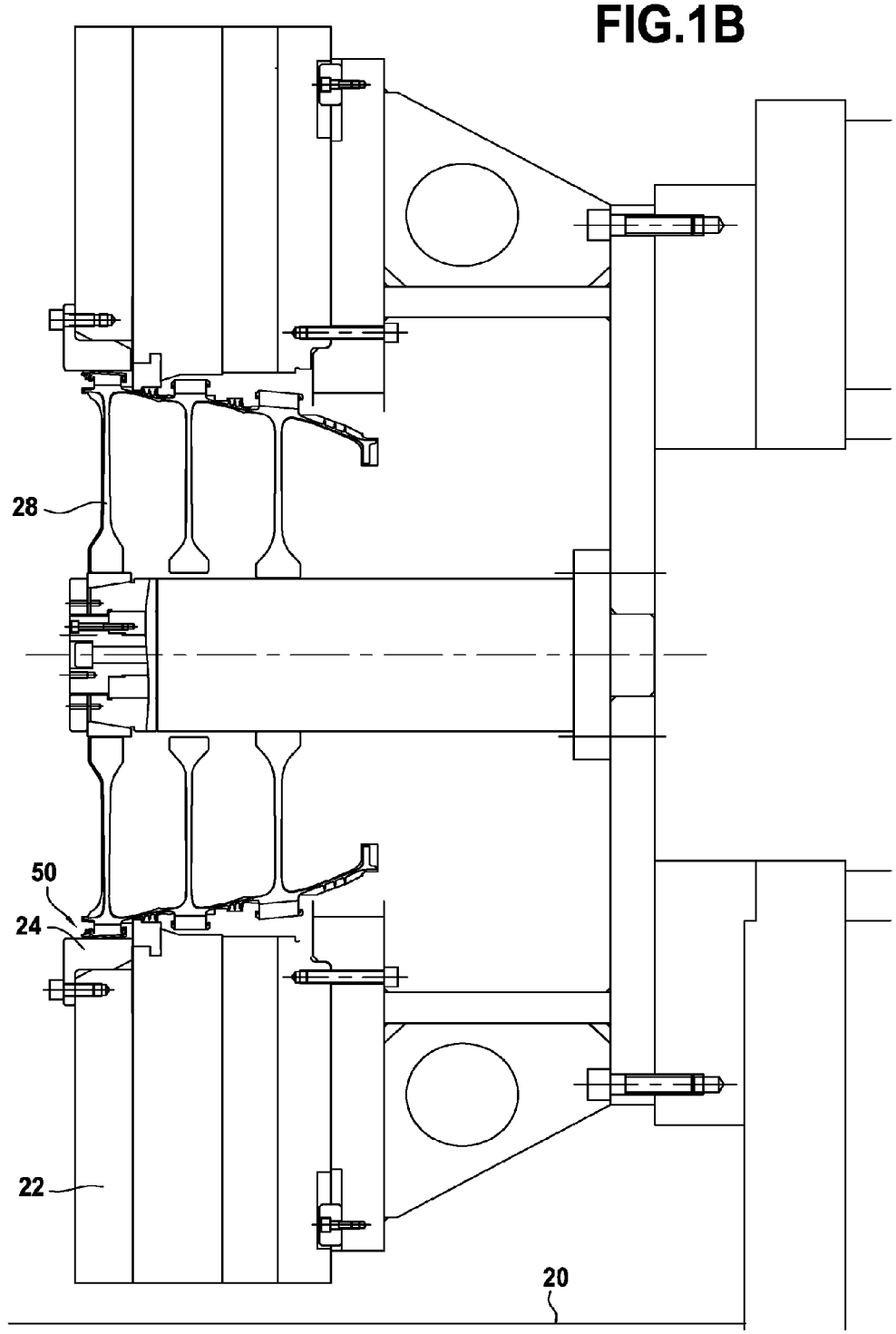
Figure 2C:
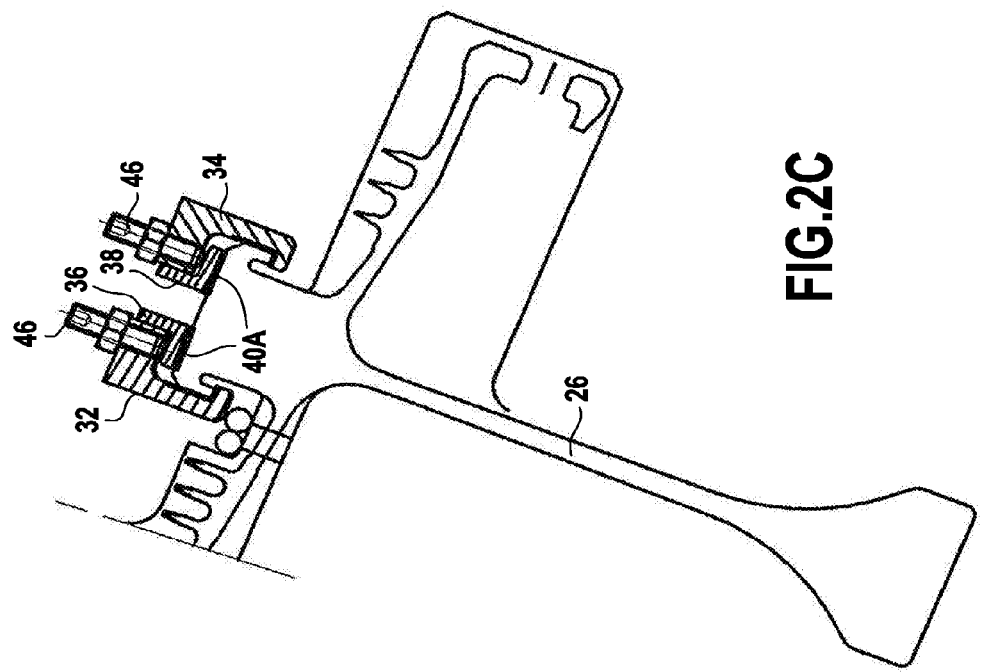
Figure 2A:
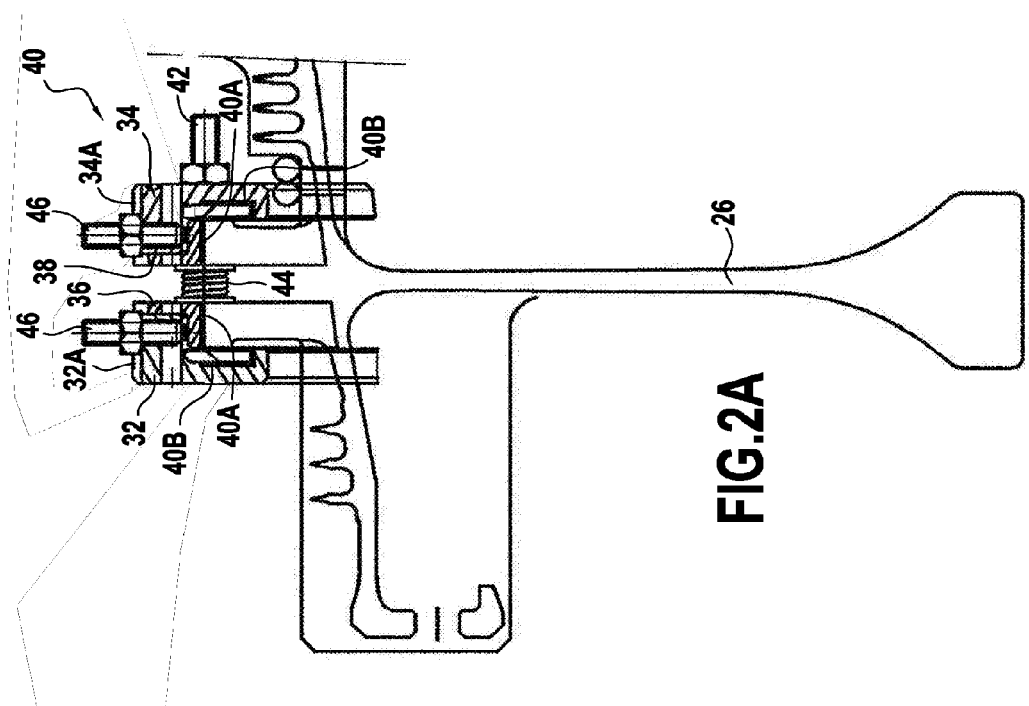

FIGS. 1A and 1B show respectively the chuck and the carriage of an inertia friction welding (IFW) machine suitable for performing the IFW method of the invention between the disks of two stages of a high-pressure compressor for a turbine engine. Naturally, the invention is applicable more generally to IFW between two portions of any rotary subassembly of such a turbine engine. The machine 10 essentially comprises firstly a chuck 12 coupled to flywheels 14 and in which one 26 of the two portions of the subassembly for welding is held by a clamp 16 and set into rotation by a motor 18 (FIG. 1A), and secondly a carriage 20 that is movable in translation and on which there is mounted a soleplate 22 having a toothed torque take-up ring gear (or jaw 24) holding the other one 28 of the two portions of the subassembly to be welded together.

The operating principle of this machine relies on the fact that the heat necessary for welding is generated by friction between two parts that are moving relative to each other. The motor 18 drives the chuck 12 in rotation, thereby enabling kinetic energy to be accumulated in the flywheel 14 until the motor has reached a predetermined speed enabling it to be disengaged. The carriage 20 is then caused to advance, bringing the two portions 26 and 28 of the subassembly for welding together into contact with each other. The friction generated by the rotation and the axial pressure of these two parts generates heating that increases the temperature such that in a relatively short length of time it reaches the temperature necessary for welding (forging temperature). In parallel, the speed of rotation decreases progressively until it comes to a complete stop once the energy accumulated in the flywheels has been spent. The axial pressure that is maintained until the part has cooled down leads to a welding bead that is characteristic of this type of friction welding. This method is not described in greater detail since it comes within the competence of the person skilled in the art to determine the parameters, speed of rotation, axial pressure, opposing torque, and carriage advance that are needed to weld together two parts of given dimensions that may be made of one or even two determined materials.

In the field of aviation, IFW is used in particular for welding together compressor disks or turbine disks that are based on titanium or nickel, and also for welding together turbine shafts that are based on steel. More particularly, FIG. 1A shows a chuck 12 having its clamp 16 clamping onto a titanium-based stage disk of a high-pressure compressor for an aeroengine and having at its periphery a plurality of hooked teeth for anchoring the roots of blades in the compressor, and FIG. 1B shows a carriage 20 having its jaw 24 clamping on the set of adjacent disks of other titanium-based stages of a high-pressure compressor for an aircraft turbine engine. Naturally, this is merely an example of disks for welding together that could be selected from numerous other potential examples.

During an IFW operation, the relative rotary movement of the disks for welding together and the associated friction lead to vibration to which the structure of the disks, the tooling, and the machine respond in the form of a structural vibratory response. This vibration depends on the shape of the disks for welding together, on how they are held in position, on welding parameters, and on the material(s) of the disks, and, depending on frequency, this vibration can lead to cracks being initiated in the disks, in particular in the hooks of the teeth.

The invention proposes damping this vibration by covering the plurality of hooked teeth with damper means 30, 40 so as to shift the frequency of the vibratory response of the hooks and of the teeth, and thus prevent any crack initiation.

FIGS. 2, 2A, 2B, and 2C show a first embodiment in which the damper means 30 are made up of a plurality of damper sectors that are regularly distributed around the disks. In the example shown, corresponding to a high-pressure compressor stage disk 3 having 70 teeth, seven adjacent sectors are provided, each extending over about 51 degrees, each sector covering ten teeth.

Each damper sector has two curved lateral flanks 32, 34 that are $\Gamma$-shaped (upside-down L shape) fitting closely to the circumference of the disk and serving, once clamped against each other, to press against the lateral edges of the teeth via a first viscoelastic gum 40A, the two top rims 32A and 34A of these flanks coming to bear against two clamping plates 36, 38 that are likewise curved circumferentially around the disk and in contact with the top edges of the teeth via a second viscoelastic gum 40B. The plates are held clamped together by bolts 42 compressing spring means 44 arranged between the two plates and acting as return springs when they are unclamped. Bolts 46 serve to hold the lateral flanks on the clamping plates.

Figure 3A:
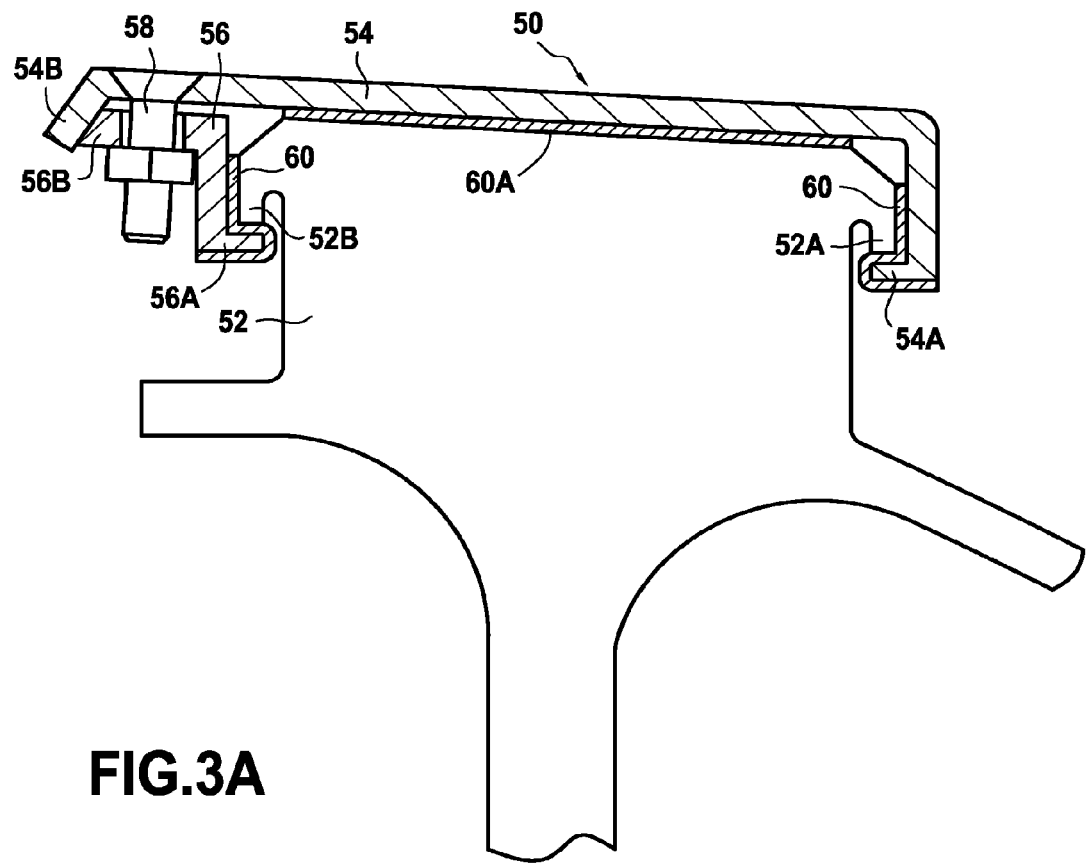
FIGS. 3A and 3B show a second embodiment of damper means used in the method of the invention.
Figure 3B:
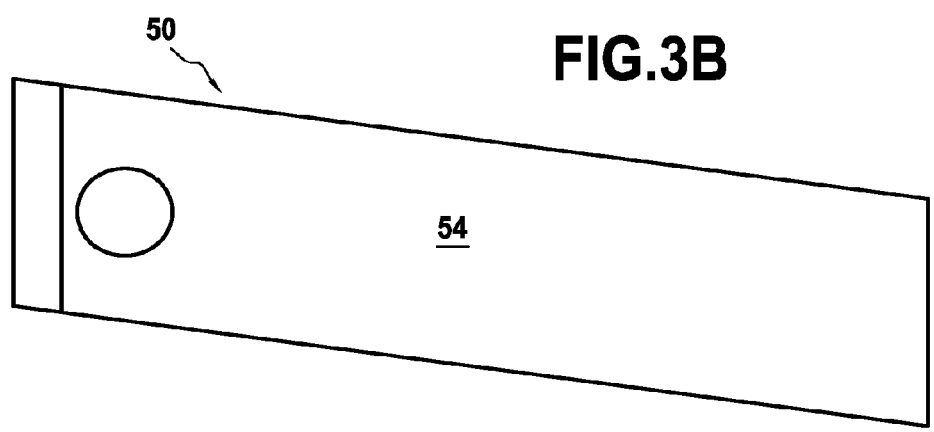

FIGS. 3A and 3B show a second embodiment in which the damper means 50 are individualized, each covering one tooth 52 of the disk. Each individual damper thus has a first blade 54 of length and width that correspond substantially to the length and the width of a tooth, and having a first end that is terminated by a rim 54A for co-operating with one 52A of the two hooks of the tooth, preferably the hook at the rear of the tooth, and a second blade 56 of length corresponding substantially to the height of the tooth but having the same width as the first blade and having its first end terminated by a rim 56A for co-operating with the other one 52B of the two hooks of the tooth (the hook at the front of the tooth accessible from the carriage), the sloping second ends 54B, 56B of these first and second blades being connected together by fastener means, typically a nut-and-bolt fastener 58. Thus, tightening the fastener so as to move the two blades towards each other enables the rims 54A, 56A to grip on the corresponding hooks 52A, 52B and thus retain the damper mechanically against the tooth. This constitutes elegant technical means enabling clamping to be applied in two directions: by sliding on the slope 54B of the first blade, the second blade 56 moves up along the axis of the bolt 58 and also moves perpendicularly relative to that axis.

Naturally, and as before, in order to ensure contact between the damper and the tooth and in order to encourage energy absorption by damping, these two blades are covered on their inside faces that come into contact with the teeth by viscoelastic gums or materials, e.g. of Smactane® or analogous type. In practice, it should be ensured that the dampers are clamped sufficiently on the teeth by regularly changing these materials, in particular when visual inspection reveals that their appearance has become degraded.

The change in the frequency response of the hooks by mechanical retention achieved using the method of the invention serves to solve the problem of cracks.

The invention claimed is:

1. An inertia friction welding (IFW) method for welding together two portions of a rotary subassembly for a turbine engine, at least one of which portions includes a plurality of hooked teeth at its periphery for anchoring blade roots, and wherein one of the two portions for welding together is held by a clamp and set into rotation by a motor, and the other one of the two portions for welding together is held by a torque take-up ring gear mounted on a carriage that is movable in translation, the method comprising:

in order to avoid any crack formation in the hooks of said teeth during welding, covering said plurality of hooked teeth with damper means suitable for shifting a frequency of a vibratory response of said teeth created by said IFW, thereby creating damping.

2. The IFW method according to claim 1, wherein said damper means comprise seven adjacent damper sectors covering said plurality of hooked teeth entirely, each covering an angle of about 51 degrees.

3. The IFW method according to claim 2, wherein each of said damper sectors has two lateral flanks fitting closely to the circumference of the disk and bearing against the lateral edges of the teeth via a first viscoelastic gum, two top rims of these flanks coming to bear against two clamping plates in contact with the top edges of the teeth via a second viscoelastic gum.

4. The IFW method according to claim 3, wherein said plates are held clamped by bolts compressing spring means arranged between these two plates and acting as a return spring when they are unclamped.

5. The IFW method according to claim 1, wherein said damper means comprise respective individual dampers mounted on each of the teeth of said plurality of hooked teeth.

6. The IFW method according to claim 5, wherein each said individual damper comprises a first blade having one end terminated by a rim co-operating with one of the two hooks of a tooth, and a second blade having one end that is terminated by a rim co-operating with the other one of the two hooks of said tooth, the other ends of said first and second blades being secured to each other by fastener means.

7. The IFW method according to claim 6, wherein said other ends of said first and second blades are each terminated by a respective slope so that by applying clamping in two directions, the rims are enabled to grip the corresponding hooks and thus retain said individual damper mechanically against said tooth.

8. The IFW method according to claim 6, wherein said first blade has length and width corresponding substantially to the length and width of a tooth, and said second blade has a length corresponding substantially to the height of a tooth and a width corresponding substantially to the width of a tooth.

9. The IFW method according to claim 8, wherein, on their inside faces in contact with said teeth, said first and second blades are covered in viscoelastic gums.

10. The IFW method according to claim 1, wherein the method is performed between stage disks of a high-pressure compressor for a turbine engine having at least one peripheral set of hooked teeth for anchoring blade roots in the compressor.

\* \* \* \* \*

UNITED STATES PATENT AND TRADEMARK OFFICE
CERTIFICATE OF CORRECTION

PATENT NO. : 9,597,748 B2
APPLICATION NO. : 15/112610
DATED : March 21, 2017
INVENTOR(S) : Benoit Lardy et al.

It is certified that error appears in the above-identified patent and that said Letters Patent is hereby corrected as shown below:

On the Title Page

Item (71), the Applicant's name is incorrect. Item (71) should read:
-- (71) Applicant: SAFRAN AIRCRAFT ENGINES, Paris (FR) --

Signed and Sealed this
Tenth Day of April, 2018

Andrei Iancu
*Director of the United States Patent and Trademark Office*